United States Patent

Malone

[11] Patent Number: 5,844,014
[45] Date of Patent: Dec. 1, 1998

[54] COMPRESSED, EXTRUDED, EVACUATED OPEN-CELL POLYMER FOAMS AND EVACUATED INSULATION PANELS CONTAINING THEM

[75] Inventor: Bruce A. Malone, Granville, Ohio

[73] Assignee: The Dow Chemical Company, Midland, Mich.

[21] Appl. No.: 829,265

[22] Filed: Mar. 31, 1997

[51] Int. Cl.[6] .................................. C08J 9/36; C08J 9/38
[52] U.S. Cl. ........................... 521/146; 521/99; 521/155; 521/918; 521/902
[58] Field of Search .............................. 521/155, 99, 146, 521/918, 902

[56] References Cited

U.S. PATENT DOCUMENTS

| | | |
|---|---|---|
| H1574 | 8/1996 | Motter et al. |
| 3,978,266 | 8/1976 | Lock ........................................ 521/51 |
| 3,978,855 | 9/1976 | McRea et al. ............................. 521/51 |
| 4,454,248 | 6/1984 | Pollack et al. ........................... 521/155 |
| 5,032,622 | 7/1991 | Herrington et al. ..................... 521/174 |
| 5,260,344 | 11/1993 | Ashida et al. ........................... 521/155 |

FOREIGN PATENT DOCUMENTS

| | | |
|---|---|---|
| 6-213561 | 8/1994 | Japan . |
| 7-119888 | 5/1995 | Japan . |

*Primary Examiner*—Morton Foelak
*Attorney, Agent, or Firm*—J. Robert Dean, Jr.

[57] ABSTRACT

Disclosed is a compressed, evacuated, open-cell polymer foam, the foam having an open cell content of about 70 percent or more prior to compression, the foam having a thickness of about 40 to about 90 percent of the initial thickness of the foam prior to compression, the foam having an absolute cell gas pressure of about 10 torr or less in its open cells, the foam having a density of about 16 to about 250 kilograms per cubic meter. Further disclosed is an evacuated insulation panel employing the foam.

20 Claims, No Drawings

COMPRESSED, EXTRUDED, EVACUATED OPEN-CELL POLYMER FOAMS AND EVACUATED INSULATION PANELS CONTAINING THEM

BACKGROUND OF THE INVENTION

This invention relates to compressed, extruded, evacuated open-cell polymer foams and evacuated insulation panels containing them.

To significantly improve the performance of insulating systems, evacuated or vacuum panel technology is currently being evaluated by industry. The absence of air or gas in the panels affords the possibility of substantial enhancement of insulating performance.

A useful evacuated panel system is one employing a panel corestock of a rigid open-cell foam. The open-cell structure of the foam allows rapid and substantially complete withdrawal of gases from within the foam structure and the panel. The rigid foam matrix provides a corestock of substantial mechanical strength and performance.

Using open-cell foams in evacuated insulation panels, it has been possible to obtain R values of 10 to 15 per inch of thickness depending upon the evacuation or vacuum level, polymer type, cell size, density, and open cell content of the foam.

It would be desirable to achieve yet higher insulation capability (lower thermal conductivity) in evacuated panels employing open-cell foams.

SUMMARY OF THE INVENTION

According to the present invention, there is a compressed, evacuated, open-cell polymer foam. The foam has: a) an open cell content of about 70 percent or more prior to compression; b) a thickness of about 40 to about 90 percent of the initial thickness or volume of the foam prior to compression; c) an absolute cell gas pressure of about 10 torr or less in its open cells; and d) a density of about 16 to about 250 kilograms per cubic meter ($kg/cm^3$) prior to compression. Surprisingly, the foam affords similar insulating performance after compression as before compression. The similar performance after compression results in significantly enhanced insulating performance or heat resistance on a per unit thickness or volume basis compared to the foam before compression.

According to the present invention, there is an evacuated foam insulation panel. The panel comprises a compressed, open-cell foam and a receptacle capable of enclosing the foam and being hermetically sealed. The foam is situated within the receptacle. The interior of the receptacle has an absolute pressure of about 10 torr or less. The foam has an open cell content of about 70 percent or more prior to (before) compression and a thickness of about 40 to about 90 percent of its initial thickness prior to compression.

DETAILED DESCRIPTION

It was found surprising the insulating performance of an evacuated, open-cell polymer foam could be maintained after compression of the foam. The resistance of the compressed foam to heat flow was similar to that of the foam before compression (uncompressed foam). An uncompressed foam is a foam which has not been substantially compressed subsequent to its manufacture and cure to a permanent form.

The maintenance of a similar degree of resistance to heat flow after compression is advantageous because similar insulating performance can be obtained with a lesser thickness or volume of foam or greater insulating performance can be obtained by adding additional foam to reconstitute to the original thickness before compression or any other thickness greater than the thickness of the compressed foam. Either way, the insulating performance of the foam on a per unit thickness basis is enhanced by compression of the foam.

With the present invention, it was found possible to significantly enhance the performance of evacuated insulation panels employing open-cell foams as a corestock. Previously, it was possible to obtain R values of up to 15 per inch of foam thickness. Now, it is possible to obtain R values of up to 40 per inch of foam thickness. Attainable R value varies according to evacuation or vacuum level, polymer type, cell size, density, and open cell content of the foam. R value is the reciprocal of thermal conductivity based upon the thermal conductivity units of $BTU\text{-}in/ft^2\text{-}hr\text{-}°F$. (British Thermal Units inch per square foot per hour per degree Fahrenheit.

The level of compression impacts the degree to which resistance to heat flow is maintained after compression, and, ultimately, the extent to which insulating performance on a per unit thickness or volume basis is enhanced. If the foam is compressed too little, the benefit of retaining similar insulating performance in as reasonably small a thickness or volume as possible is not realized. If the foam is compressed too much, its insulating performance compared to the uncompressed foam dissipates so much that its insulating performance on a per unit thickness or volume basis is not further enhanced. Further, with too much compression, foam mechanical properties may become denuded.

The foams are desirably compressed to about 30 to about 90 percent, preferably from about 40 to about 70 percent, and more preferably 50 to about 60 percent of their initial (original) thickness or volume prior to compression. The preceding extent of compression ranges are generalized. Desired compression levels will be a function of polymer identity, foam physical properties, level of evacuation, and desired insulating performance.

It is desirable to have or to maintain as high an open cell content as possible. The higher the open cell content, the greater the level of evacuation or vacuum possible in the foam. The greater the level of evacuation, the lower the potential thermal conductivity and the greater the resistance to heat flow. The present foam has an open cell content of 70 percent or more, preferably 90 percent or more, and most preferably 95 percent or more prior to compression according to ASTM D2856-A. The foam is preferably as close as possible to complete or 100 percent open cell. The open cell content after compression will be equal to or greater than the open cell content prior to or before compression.

An evacuated foam is a foam having within its open cells a partial vacuum or near total vacuum of subatmospheric absolute pressure. The present foam has an absolute pressure of about 10 torr or less, more preferably about 1 torr or less, and most preferably about 0.1 torr or less in its open cells.

The foam prior to compression (uncompressed foam) has a density of about 16 to about 250 $kg/cm^3$ and most preferably about 25 to about 100 $kg/cm^3$ according to ASTM D-1622-88. Density will increase proportionately with the extent of compression.

In the prior art, many types of polymer foams were compressed for a variety of purposes. U.S. Pat. Nos. 3,650,993; 3,740,283; 4,228,076; and 4,252,517 relate methods for densifying polyurethane foams, including open-cell foams, by compression to some desired thickness. U.S. Pat. No.

4,656,906 relates a method for reticulating a polyurethane foam by compression. U.S. Pat. No. 4,877,814 relates a method for making an open-cell polyethylene foam from a closed-cell polyethylene foam by compression. U.S. Pat. No. 4,510,268 relates a method for improving the physical properties of an extruded, closed-cell polystyrene foam sheet by compression; such sheets are taught as useful for low temperature and cryogenic insulation. U.S. Pat. Nos. 3,863,908 and 5,114,656 relate methods for improving the properties of polystyrene bead foams by compression; the foams are described as useful in building, insulation, and packaging applications.

The present compressed, evacuated foam distinguishes the above prior art compressed foams in that it is both open cell and evacuated. The present foams are able to maintain a much greater degree of their insulating performance or heat resistance after compression than do open or closed cell foams at ambient pressure. Open or closed cell foams at ambient pressure can exhibit as much as a 70 to 75 percent increase in heat flow after compression compared to heat flow prior to or before compression at otherwise constant conditions. In contrast, preferred present compressed, evacuated foams can exhibit as little as a 15 percent increase in heat flow after compression and as little as a 5 percent increase in heat flow after compression when in most preferred compression levels.

The foam may take any physical configuration known in the art such as sheet or plank. The foam is particularly suited to be formed into a plank, desirably one having a cross-sectional area of 30 square centimeters (cm) or more and a minor dimension in cross-section (thickness) of about ⅜ inch (0.95 cm) or more. Alternately, multiple foam sheets can be stacked to form a thicker foam body. Using multiple sheets allows for more rapid evacuation of gases from the interior of the evacuated panel.

The foam preferably contains an infrared attenuating agent (IAA) to enhance its insulating performance. The IAA is composed of a different substance than the polymer substrate of the foam in which it is incorporated. The IAA may absorb or reflect infrared radiation or both. Useful IAA include particulate flakes of metals such as aluminum, silver, and gold and carbonaceous substances such as carbon black, activated carbon black and graphite. Useful carbon blacks include thermal black, furnace black, acetylene black, and channel black. Preferred IAA are thermal black and graphite. The IAA preferably comprises between about 1.0 and about 25 weight percent and preferably between about 2.0 and about 20 weight percent and most preferably about 3.0 to about 10 weight percent based upon the weight of the polymer material.

Various additives may be incorporated in the compressed foam such as inorganic fillers, pigments, antioxidants, acid scavengers, ultraviolet absorbers, flame retardants, processing aids, extrusion aids, and the like.

The present foam may be used to insulate a surface by applying to the surface an evacuated insulating panel employing the present foam. Such panels are useful in any conventional insulating applications such as roofing, buildings, refrigerators, controlled temperature shipping containers, water heaters, refrigerated trucks and rooms, etc.

The present foam is particularly useful as corestock in a hermetically-sealed evacuated panel. The panel may be formed as follows: a) the foam is placed inside a receptacle or enclosure such as a bag; b) the interior of the receptacle or enclosure and the foam are evacuated to a partial or near total vacuum; and c) the receptacle or enclosure is sealed to be air tight or hermetically sealed. The interior of the evacuated or vacuum panel is evacuated to about 10 torr or less, more preferably to about 1 torr or less, and most preferably to about 0.1 torr or less absolute pressure.

A useful evacuated panel employs as an enclosure formed of a laminate sheet of three or more layers. The outer layer comprises a scratch resistant material such as a polyester. The middle layer comprises a barrier material such as aluminum, polyvinylidine chloride, and polyvinyl alcohol. The inner layer comprises a heat sealable material such as polyethylene or ethylene/acrylic acid copolymer.

To further enhance the long-term performance of the vacuum panel, the evacuated interior of the panel may be provided with a "getter" material. The getter material adsorbs gases and/or vapors which seep or permeate into the vacuum panel over time. Conventional getter materials include metal and metal alloys of barium, aluminum, magnesium, calcium, iron, nickel, and vanadium. Teachings to suitable getter materials include but are not limited to those set forth in U.S. Pat. Nos. 5,191,980; 5,312,606; 5,312,607; and WO 93/25843, which are incorporated herein by reference.

Other types of useful getter materials include conventional dessicants, which are useful for adsorbing water vapor or moisture. Such materials are advantageously incorporated into the evacuated insulation panel in the form of a packet having a porous or permeable wrapper or receptacle containing the material therein. Useful materials include silica gel, activated alumina, aluminum-rich zeolites, calcium chloride, calcium oxide, and calcium sulfate. A preferred material is calcium oxide.

Open-cell foams of virtually any average cell size can be employed in the present invention, but it is preferable to use a foam with an average size as small as possible to minimize foam thermal conductivity. Preferred foams are microcellular and have an average cell size of about 70 micrometers or less, more preferably about 1 to about 30 micrometers, and most preferably about 1 to about 20 micrometers according to ASTM D3576-77. The smaller the average cell size, the smaller the potential foam thermal conductivity. The cell size or pore size (diameter) for the microcellular foams is determined according to ASTM D3576-77 except that measurement is taken from an enlarged photograph obtained by scanning electron microscopy instead of measurement taken directly from the foam.

Extruded thermoplastic foams are generally prepared by heating a polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. The nucleating agent additive may be blended in the polymer melt or dry blended with the polymer material prior to plasticizing or melting. The foamable gel is typically cooled to a lower temperature to optimize or attain desired physical characteristics of the foam. The gel may be cooled in the extruder or other mixing device or in separate coolers. The gel is then extruded or conveyed through a die of desired shape to a zone of reduced or lower pressure to expand to form the foam. The zone of lower pressure is at a pressure lower than that in which the foamable gel is maintained prior to extrusion through the die. The lower pressure may be superatmospheric or subatmospheric (evacuated or vacuum), but is preferably at an atmospheric level.

Optionally, after extrusion from the die, the expanding foam may be passed between parallel plates or other forming devices to enhance skin quality and to ensure production of foam of desired dimension and specification. Such forming is not considered compression because it occurs while the foam is still expanding and takes place above the glass transition temperature of the constituent polymer material. Compression can occur after expansion of the foam is complete and the temperature of the foam has fallen below the glass transition temperature of the constituent polymer material.

Compression may be accomplished by any means known in the art such as between opposing parallel plates or opposing rollers. Compression may be effected on-line as a part of a continuous manufacturing process or may be effected off-line on individual foam planks or sheets.

Preferred microcellular foams are extruded, microcellular alkenyl aromatic polymer foams. They are preferred because it is possible to make such foams to a relatively small average cell size, such as 10 micrometers and smaller. Extruded, open-cell microcellular alkenyl aromatic polymer foams having an open cell content of about 70 percent or more and an average cell size of about 70 micrometers or less may be made by the following process: a) heating an alkenyl aromatic polymer material to form a melt polymer material; b) incorporating into the melt polymer material a nucleating agent additive at from about 0.1 to about 5 parts by weight per hundred parts polymer material; c) incorporating into the melt polymer material at an elevated pressure to form a foamable gel a blowing agent of which about 50 mole percent or more and preferably about 70 mole percent or more is selected from the group consisting of 1,1-difluoroethane (HFC-152a), 1,1,1-trifluoroethane (HFC-143a), 1,1,1,2-tetrafluoro-ethane (HFC-134a), chlorodifluoromethane (HCFC-22), carbon dioxide ($CO_2$), and difluoromethane (HFC-32), and mixtures of the foregoing based upon the total number of moles of blowing agent, the blowing agent being present at about 0.06 to about 0.17 gram-moles or less and preferably about 0.08 to about 0.12 gram-moles or less per kilogram of polymer material; d) cooling the foamable gel to a foaming temperature sufficient to form a foam having about 70 percent or more open cell content; and e) extruding the foamable gel through a die into a region of lower pressure to form the foam. Preferred foaming temperatures will vary from about 118° C. to about 150° C. and preferably about 125° C. to about 135° C. depending upon conditions.

Additional teachings to microcellular foams are seen in U.S. Ser. No. 08/430,783 filed Apr. 27, 1995, which is incorporated herein by reference.

Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably greater than 70 weight percent alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. Preferred foams comprise substantially (i.e., greater than 95 percent) and most preferably entirely of polystyrene.

Open-cell microcellular alkenyl aromatic polymer foams are particularly suited to be formed into a sheet or plank. The foam is particularly suited to be extruded into a plank, desirably one having a cross-sectional area of 30 square centimeters (cm) or more and a minor dimension in cross-section (thickness) of about ⅜ inch (0.95 cm) or more. Alternately, multiple foam sheets can be stacked to form a thicker corestock. Using multiple sheets allow more rapid evacuation of gases from the interior of the evacuated panel.

Open-cell polyurethane and polyisocyanurate foams can be made by reacting two preformulated components, commonly called the A-component and the B-component. The blowing agent may be dispersed in either the isocyanate or the polyol or both.

Suitable polyisocyanates include diisocyanates such as m-phenylene diisocyanate, toluene-2,4-diisocyanate, toluene-2,6-diisocyanate, mixtures of 2,4-and 2,6-toluene diisocyanate, hexamethylene-1,6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenyl methane-4,4'-diisocyanate, 4,4'-diphenylenediisocyanate, 3,3'-dimethoxy-4,4'-biphenyldiisocyanate, 3,3'-dimethyl-4,4'-biphenyldiisocyanate, and 3,3'-dimethyldiphenylmethane-4,4'-diisocyanate; the triisocyanates such as 4,4',4"-triphenylmethane-triisocyanate, polymethylenepolyphenyl isocyanate, toluene-2,4,6-triisocyanate; and the tetraisocyanates such as 4,4'-dimethyldiphenylmethane-2,2', 5,5'- tetraisocyanate.

Suitable polyols include: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane; 2- methyl-1,3-propane diol; glycerin; trimethylolpropane; trimethylolethane; hexane triol-(1,2,6); butane triol-(1,2,4); pentaerythritol; quinitol; mannitol; sorbitol; formitol; a-methyl-glucoside; diethylene glycol; triethylene glycol; tetraethylene glycol and higher polyethylene glycols; dipropylene glycol and higher polypropylene glycols as well as dibutylene glycol and higher polybutylene glycols. Suitable polyols further include oxyalkylene glycols, such as diethylene glycol, dipropylene glycol, triethylene glycol, tripropylene glycol, tetraethylene glycol, tetrapropylene glycol, trimethylene glycol and tetramethylene glycol.

Polyurethane foams can be prepared by reacting the polyol and the isocyanate on a 0.7:1 to 1.1:1 equivalent basis. The polyisocyanurate foams of the invention are advantageously prepared by reacting the polyisocyanate with a minor amount of polyol to provide about 0.10 to 0.70 hydroxyl equivalents of polyol per equivalent of polyisocyanate. Useful polyurethanes and polyisocyanurates and processes for making them are seen in U.S. Pat. Nos. 3,580,869; 4,795,763; 5,288,766; 5,334,624; and 5,346,928, which are incorporated herein by reference. Open-cell polyurethane foams with average cell sizes as little as 50 micrometers have been produced commercially for use in evacuated panels.

Another useful foam as a corestock are microporous thermoplastic foams. Microporous thermoplastic foams can be formed by phase separation, by microemulsions, or by use of supercritical fluids such as seen in U.S. Pat. Nos. 4,673,695; 4,473,665; 5,037,859; 5,158,986; and 5,334,356, which are incorporated herein by reference. Useful pore sizes (corresponding to cell sizes) are the same as those described for the microcellular foams above.

The following are examples of the present invention, and are not to be construed as limiting. Unless otherwise indicated, all percentages, parts, or proportions are by weight based upon polymer weight.

EXAMPLES

Examples 1–3 and Control Examples 1A–3A

Open-cell foams were measured for permitted heat flow rate before and after compression at a vacuum of 0.2 torr (examples). Corresponding foams at atmospheric pressure were likewise measured for heat resistance before and after compression (control examples).

Examples 1–2 were extruded microcellular polystyrene foams containing 7 parts per hundred (pph) graphite based upon the weight of the polymer as an infrared attenuating additive. Example 3 was a rigid polyurethane foam which did not contain an infrared attenuating additive.

As seen from Table 1, the foams of the examples retained all or substantially all of their original levels of heat resistance (inversely related to heat flow rate shown in Table 1) after compression. In contrast, the foams of the control examples exhibited markedly lower levels of heat resistance after compression.

While embodiments of the compressed foam and the evacuated insulation panel of the present invention have been shown with regard to specific details, it will be appreciated that depending upon the manufacturing process and the manufacturer's desires, the present invention may be modified by various changes while still being fairly within the scope of the novel teachings and principles herein set forth.

TABLE 1

Effect of Foam Compression on Heat Flow Rate Through Foam Samples Under Vacuum and at Atmospheric Pressure

| Sample Number | Foam Cell Gas Pressure | Initial Open Cell (percent) | Final Open Cell (percent) | Initial Thickness (inch (cm)) | Final Thickness (inch (cm)) | Level of Compression (percent) | Initial Heat Flow Rate[1] (BTU/ft$^2$-hr-°F.) ((W/m$^2$-°K.)) | Final Heat Flow Rate[2] (BTU/ft$^2$-hr-°F.) ((W/m$^2$-°K.)) | Change in Heat Flow Upon Compression (percent) |
|---|---|---|---|---|---|---|---|---|---|
| 1* | 760 torr | >99 | >99 | 1.11 (2.82) | 0.74 (1.90) | 33 | 0.209 (11.56) | 0.293 (16.20) | +40 |
| 1A | 0.2 torr | >99 | >99 | 1.11 (2.82) | 0.74 (1.90) | 33 | 0.041 (2.27) | 0.045 (2.49) | +9 |
| 2* | 760 torr | >99 | >99 | 1.00 (2.54) | 0.62 (1.60) | 38 | 0.233 (12.88) | 0.312 (17.25) | +34 |
| 2A | 0.2 torr | >99 | >99 | 0.66 (1.70) | 0.37 (0.94) | 44 | 0.077 (4.26) | 0.080 (4.42) | +4 |
| 3* | 760 torr | >99 | >99 | 1.07 (2.72) | 0.69 (1.80) | 36 | 0.251 (13.88) | 0.344 (19.02) | +37 |
| 3A | 0.2 torr | >99 | >99 | 1.07 (2.72) | 0.69 (1.80) | 36 | 0.139 (7.69) | 0.138 (7.63) | +0 |

*Not an example of the present invention
Sample Number 1. Open cell polystyrene foam, 7 pph graphite, 2.7 pounds per cubic foot (pcf) (43.2 kilograms (kg)) density
Sample Number 2. Open cell polystyrene foam, 7 pph graphite, 4.1 pcf (65.6 kg) density
Sample Number 3. Open cell rigid polyurethane foam, 5.2 pcf (83.2 kg) density
[1]Initial heat flow rate per degree temperature; also corresponds to thermal conductivity divided by initial thickness
[2]Final heat flow rate per degree temperature; also corresponds to thermal conductivity divided by final thickness

What is claimed is:

1. A method of enhancing insulating capability of an evacuated open-cell thermoplastic foam on a per unit thickness or volume basis, the method comprising the following steps:
    a) providing an open-cell polymer foam having an open cell content of 90 percent or more prior to compression and having a density of about 16 to about 250 kilograms per cubic meter prior to compression;
    b) compressing the foam to a thickness of about 40 to about 90 percent of the initial thickness of the foam prior to compression; and
    c) evacuating the foam to an absolute cell gas pressure of about 1 torr or less in its open cells.

2. The method of claim 1, wherein the foam is compressed to a thickness of about 40 to 90 percent of the initial thickness of the foam prior to compression.

3. The method of claim 1, wherein the foam is evacuated an internal absolute cell gas pressure of about 0.1 torr or less in its open cells.

4. The method of claim 1, wherein the foam has an average cell size of about 1 to about 70 micrometers prior to compression.

5. The method of claim 1, wherein the foam has an average cell size of about 1 to about 30 micrometers prior to compression.

6. The method of claim 1, wherein the foam has an average cell size of 5 to 20 micrometers prior to compression.

7. The method of claim 1, wherein the foam has an open cell content of about 90 percent or more prior to compression.

8. The method of claim 1, wherein the foam has an open cell content of about 95 percent or more prior to compression.

9. The method of claim 1, wherein the foam has a thickness of about 40 to about 70 percent of the initial thickness of the foam prior to compression.

10. The method of claim 1, wherein the foam has a thickness of about 50 to about 60 percent of the initial thickness of the foam prior to compression.

11. The method of claim 1, wherein the foam is an alkenyl aromatic polymer foam, the foam comprising an alkenyl aromatic polymer material comprising greater than 50 percent by weight of alkenyl aromatic monomeric units.

12. The method of claim 1, wherein the foam has a density of about 25 to 100 kilograms per cubic meter.

13. The method of claim 1, wherein the foam has an average cell size of about 1 to about 70 micrometers prior to compression, the foam being evacuated to an internal absolute cell gas pressure of about 1 torr or less in its open cells, the foam having a density of from about 16 to about 100 kilograms per cubic meter prior to compression, the foam having an open cell content of about 90 percent or more prior to compression.

14. The method of claim 1, wherein the foam has an average cell size of about 1 to about 30 micrometers prior to compression, the foam being evacuated to an internal absolute cell gas pressure of about 0.1 torr or less in its open cells, the foam having a thickness of 40 to about 70 percent of the initial thickness of the foam prior to compression, the foam having a density of from about 25 to about 100 kilograms per cubic meter prior to compression, the foam having an open cell content of about 95 percent or more prior to compression.

15. The method of claim 13, wherein the foam is an extruded foam, the alkenyl aromatic polymer material comprising about 70 percent or more by weight of alkenyl aromatic monomeric units, the alkenyl aromatic polymer material comprising polystyrene.

16. The method of claim 14, wherein the foam is an extruded foam, the alkenyl aromatic polymer material comprising about 70 percent or more by weight of alkenyl aromatic monomeric units, the alkenyl aromatic polymer material comprising polystyrene.

17. The method of claim 1, wherein the foam is compressed such that it exhibits a 15 percent or lower increase in heat flow after compression.

18. The method of claim 13, wherein the foam is compressed such that it exhibits a 15 percent or lower increase in heat flow after compression.

19. The method of claim 14, wherein the foam is compressed such that it exhibits a 15 percent or lower increase in heat flow after compression.

20. The method of claim 1, wherein the foam is compressed such that it exhibits a 5 percent or lower increase in heat flow after compression.

* * * * *